(12) United States Patent
Duret

(10) Patent No.: US 10,775,196 B2
(45) Date of Patent: Sep. 15, 2020

(54) SYSTEM FOR DETERMINING AT LEAST ONE ROTATION PARAMETER OF A ROTARY MEMBER

(71) Applicant: NTN-SNR ROULEMENTS, Annecy (FR)

(72) Inventor: Christophe Duret, Bluffy (FR)

(73) Assignee: NTN-SNR Roulements, Annecy (FR)

(*) Notice: Subject to any disclaimer, the term of this patent is extended or adjusted under 35 U.S.C. 154(b) by 32 days.

(21) Appl. No.: 16/298,126

(22) Filed: Mar. 11, 2019

(65) Prior Publication Data
US 2019/0277659 A1    Sep. 12, 2019

(30) Foreign Application Priority Data

Mar. 12, 2018 (FR) ...................................... 18 52092

(51) Int. Cl.
*G01D 5/14* (2006.01)
*G01D 5/244* (2006.01)

(52) U.S. Cl.
CPC ......... *G01D 5/145* (2013.01); *G01D 5/24438* (2013.01)

(58) Field of Classification Search
CPC ...... G01D 5/145; G01D 5/24438; G01D 5/12; G01B 7/30

USPC .................................. 324/207.21, 207.25
See application file for complete search history.

(56) References Cited

U.S. PATENT DOCUMENTS

2017/0115134 A1*  4/2017  Wolf ................... G01D 5/2452

FOREIGN PATENT DOCUMENTS

| DE | 10309027 A1 | 9/2004 |
| WO | 2004083881 A1 | 9/2004 |
| WO | 2006064169 A2 | 6/2006 |

* cited by examiner

*Primary Examiner* — Farhana A Hoque
(74) *Attorney, Agent, or Firm* — Murtha Cullina LLP

(57) ABSTRACT

The invention relates to a system comprising: an encoder the magnetic track of which has an alternation of North and South magnetic poles separated by transitions in Archimedean spiral, a rotation sensor able to detect the periodic magnetic field emitted by the encoder using a plurality of magnetic sensitive elements, distributed angularly along the magnetic track. Each magnetic sensitive element delivers a signal representative to the rotation of the encoder. The sensor further comprises a device for subtracting the signals ($V_1$, $V_2$) delivered by two sensitive elements forming therebetween an angle γ that is such that: $0.55\pi < \gamma \cdot N_{pp} < 0.83\pi$, modulo $2\pi$ or $1.17\pi < \gamma \cdot N_{pp} < 1.45\pi$, modulo $2\pi$.

10 Claims, 1 Drawing Sheet

SYSTEM FOR DETERMINING AT LEAST ONE ROTATION PARAMETER OF A ROTARY MEMBER

CROSS-REFERENCES TO RELATED APPLICATIONS

This application claims the priority of French patent application number 18 52092, filed on Mar. 12, 2018, the entire contents of which are incorporated herein by reference.

TECHNICAL FIELD

The invention relates to a system for determining at least one rotation parameter of a rotary member, the system comprising an encoder emitting a periodic magnetic signal as well as a rotation sensor able to detect the magnetic field.

BACKGROUND

In many applications, it is desired to know in real time and with an optimum quality at least one rotation parameter of a rotary member, such as the position, speed, acceleration or direction of movement thereof.

To do this, document WO-2006/064169 proposes the use of an encoder intended to be rigidly connected to the movable member and on which is formed a magnetic track that is able to emit a pseudo-sinusoidal magnetic field at a reading distance of a sensor comprising a plurality of sensitive elements.

Advantageously, each sensitive element may comprise at least one pattern based on a tunnel magneto resistance (TMR) material the resistance of which varies according to the detected magnetic field, such as, for example, described in document WO-2004/083881.

In order to determine a movement parameter of the movable member according to the evolution of the detected magnetic field, document WO-2006/064169 provides a combination of signals representative of the resistance of each of the sensitive elements in order to deliver two signals in quadrature and of the same amplitude that can be used to calculate the parameter. Furthermore, this solution provides a two-by-two subtraction of four signals, in order to obtain two signals in quadrature that are free of common noise.

In particular, the encoder comprises an alternating succession of North and South poles defining a constant polar width $$L_p = \frac{\pi R}{Npp}$$

along the reading radius R for a given number $N_{pp}$ of pairs of poles, the sensitive elements being equally distributed from a distance $$\frac{L_p}{2}$$

to be able to deliver the signals in quadrature.

In some applications, the encoder must have a small number of pairs of poles, typically less than 6, so that the polar width $L_p$ thereof becomes wide, in particular of the order of ten millimetres.

However, these wide poles deliver a magnetic signal the sinusoidality of which is poor at low reading air gap, requiring a distancing of the sensitive elements from the magnetic track, which goes against the amplitude of the signal and therefore the good detection thereof by the sensitive elements.

In addition, wide poles require a thickness of the encoder which is also greater in order to preserve the sinusoidality and the amplitude of the magnetic signal. This is not favourable to the integration of the encoder in reduced dimensions and complicates the magnetisation method because a greater thickness must be magnetically saturated.

Moreover, it is known, in particular from document DE-103 09 027, encoders the magnetic transitions of which between the North and South poles extend along an Archimedean spiral, each of the spirals being distributed on the encoder by successive rotation of an angle $$\frac{\pi}{Npp}.$$

The advantage of this type of encoder is that the polar width $L_p$ of each of the poles along the radius of the encoder becomes independent of the number $N_{pp}$ of pairs of poles, thus being able to reconcile a small number of poles with an adequate positioning of the sensitive elements relative to the sinusoidality and the amplitude of the magnetic signal to be detected.

However, the prior art proposes a positioning of the sensitive elements along the radius of such an encoder, which poses a certain number of problems.

In particular, to satisfy the compromise between sinusoidality and amplitude, the sensitive elements are arranged at an air gap distance from the magnetic track which is of the order of $$\frac{L_p}{2}.$$

Thus, in particular to avoid risking a mechanical interaction between the fixed sensor and the rotary encoder, the polar width $L_p$ must typically be between 2 and 6 mm.

Yet, in order to avoid the edge effects of the magnetic field delivered by the encoder, the sensitive elements must be positioned in relation to the magnetic track with at least one pair of poles on each side in the radial direction, i.e. two $L_p$ on each side in addition to the radial space necessary for the arrangement of the sensitive elements.

As a result, the encoder must have a significant height, in particular greater than 6·$L_p$, height that may not be available in some integrations.

Moreover, the magnetic field generated by a spiral encoder on a pair of magnetic poles is the combination of a fundamental by definition perfectly sinusoidal and a plurality of odd-order harmonics, including the 3rd order harmonic that typically represents 5% of the fundamental. According to the position of the sensor and the reading air gap, this proportion of the 3rd order harmonic may be much greater.

In order to obtain an accurate determination of the rotation parameter, it is desired to measure the filtered signal of at least the 3rd order harmonic. However, any fixed compensation of the error provided by the harmonics is difficult to produce, in particular in that it depends on the measurement conditions (air gap, position of the sensor). Moreover, a calibration is also difficult to envisage for a large volume and low-cost application.

The invention aims to solve the problems of the prior art by proposing in particular a system for determining at least one rotation parameter of a rotary member, wherein the accuracy of the determination is improved. Furthermore, the system according to the invention provides a compromise between the periodicity and the amplitude of the magnetic signal detected without inducing specific space constraints for the encoder delivering the signal, and in particular in relation to a magnetic encoder with a low number of pairs of poles.

To this end, the invention proposes a system for determining at least one rotation parameter of a rotary member, the system comprising:

an encoder intended to be combined in rotation with the rotary member so as to move jointly therewith, the encoder comprising a body whereon is formed a magnetic track that is able to emit a periodic magnetic signal representative of the rotation of the encoder, the track having an alternation of North and South magnetic poles separated by i transitions, each of the transitions extending along an Archimedean spiral defined in polar coordinates in relation to the axis of rotation by the equation $$\rho = \frac{Npp \cdot Lp}{\pi} \cdot (\theta + \theta_i),$$

$N_{pp}$ being the number of pairs of poles of the magnetic track and $L_p$ the polar width of each of the poles according to the radius of the encoder, the angle $\theta_i$ of rotation of the $i^{th}$ spiral in relation to the first spiral being equal to $$\frac{\pi}{Npp} \cdot i$$

with i between 0 and $2 \cdot N_{pp}-1$;

a rotation sensor able to detect the periodic magnetic field emitted by the encoder by means of a plurality of magnetic sensitive elements, distributed angularly along the magnetic track to each deliver a signal representative of the rotation of the encoder, the sensor further comprising a device for subtracting the signals delivered by two sensitive elements forming therebetween an angle γ that is such that:
$0.55\pi < \gamma \cdot N_{pp} < 0.83\pi$, modulo $2\pi$; or
$1.17\pi < \gamma \cdot N_{pp} < 1.45\pi$, modulo $2\pi$.

BRIEF DESCRIPTION OF THE DRAWINGS

Other features and advantages of the invention will appear in the following description, made with reference to appended FIG. 1 diagrammatically showing a determination system according to the invention, in particular showing the arrangement of the sensitive elements in relation to the encoder.

DETAILED DESCRIPTION

Figure 1:
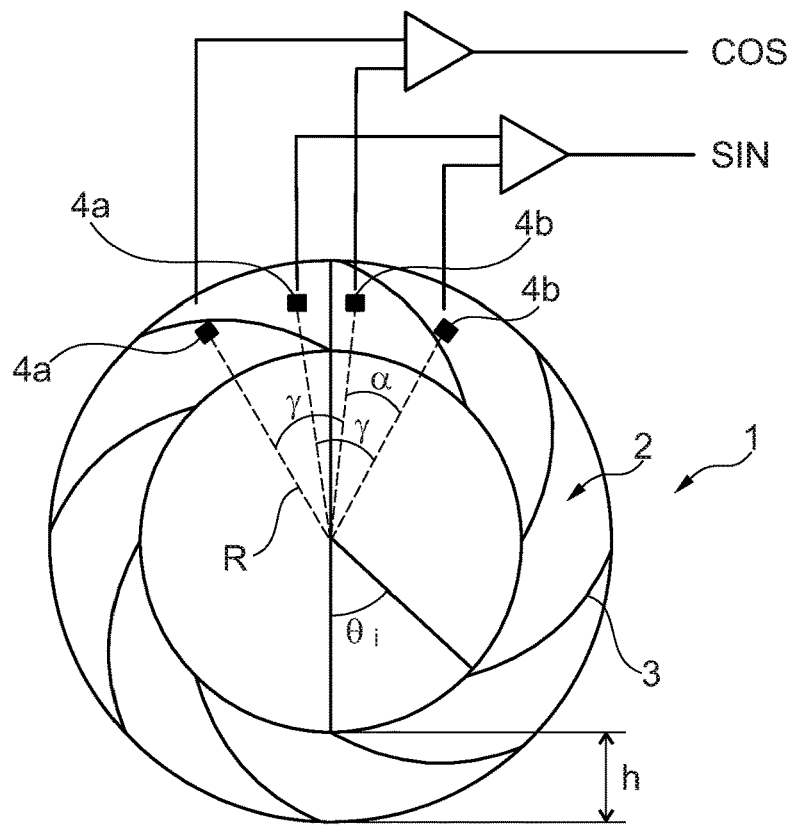

In relation with these figures, a system for determining at least one rotation parameter of a rotary member in relation to a fixed structure is described. In particular, the parameter of the rotary member may be chosen from the position, speed, acceleration or direction of movement thereof.

In a specific application, the system may be used in relation with the control of a brushless direct current electric motor, in particular making it possible to know the absolute angular position on a pair of motor poles of the rotor in relation to the stator.

The determination system comprises an encoder 1 intended to be rigidly connected to the rotary member so as to move jointly therewith, the encoder comprising a body, in particular annular but that may also be discoidal, whereon is formed a magnetic track 2 that is able to emit a periodic magnetic signal representative of the rotation of the encoder. In particular, the magnetic signal emitted may be sinusoidal or pseudo-sinusoidal, that is to say having at least one portion that can be correctly approximated by a sinusoid.

The track 2 has an alteration of North and South magnetic poles that are separated by i transitions 3, each of the transitions extending along an Archimedean spiral defined in polar coordinates (ρ, θ) in relation to the axis of rotation by the equation $$\rho = \frac{Npp \cdot Lp}{\pi} \cdot (\theta + \theta_i),$$

$N_{pp}$ being the number of pairs of poles of the magnetic track 2 and $L_p$ the polar width of each of the poles according to the radius of the encoder 1, the angle $\theta_i$ of rotation of the $i^{th}$ spiral in relation to the first spiral being equal to $$\frac{\pi}{Npp} \cdot i$$

with i between 0 and $2 \cdot N_{pp}-1$.

Thus, the magnetic track 2 delivers a pseudo-sinusoidal magnetic signal the spatial period of which is equal to $\lambda = 2 \cdot L_p$. Furthermore, the Archimedean spiral geometry makes it possible in particular for the number $N_{pp}$ of pairs of poles of the magnetic track 2 as well as the polar width $L_p$ to be chosen independently of the radius R of the magnetic track 2.

According to one embodiment, the encoder 1 is formed of a magnet whereon the multipolar magnetic track 2 is produced. In particular, the magnet may be formed of an annular matrix, for example, made of a plastic or elastomeric material, wherein are dispersed magnetic particles, including ferrite particles or rare earths such as NdFeB.

The determination system comprises a rotation sensor that is intended to be rigidly connected to the fixed structure, the sensor being able to detect the periodic magnetic field emitted by the encoder 1. To do this, the sensor comprises a plurality of magnetic sensitive elements 4a, 4b that are arranged at reading air gap of the magnetic field delivered by the magnetic track 2 in order to each deliver a signal representative of the rotation of the encoder 1.

Each of the sensitive elements 4a, 4b may in particular be chosen from the magnetosensitive sensors. For example, sensors based on Hall effect, tunnel magneto resistance (TMR), anisotropic magneto resistance (AMR) or giant magneto resistance (GMR) can measure a component of the magnetic field (normal or tangential to the encoder 1) or the rotary field (resulting from normal and tangential components).

In particular, as described in document WO-2004/083881, each patter forms a tunnel junction by comprising a stack of a reference magnetic layer, an insulating separation layer and a magnetic layer sensitive to the field to be detected, the resistance of the stack being a function of the relative orientation of the magnetisation of the magnetic layers.

Advantageously, each sensitive element $4a$, $4b$ may comprise at least one pattern based on a magnetoresistive material the resistance of which varies according to the magnetic field, a sensitive element $4a$, $4b$ that may comprise a single pattern or a group of patterns connected in series.

Alternatively, the normal component alone of the magnetic field delivered by the encoder 1 may be measured, for example, thanks to Hall effect elements. Use of the normal field alone is favourable because it is more sinusoidal than the tangential field.

In relation with FIG. 1, the sensor comprises two groups of two sensitive elements $4a$, $4b$ forming therebetween an angle $\gamma$, the groups being angularly offset from an angle $\alpha$. In order to be able to determine the rotation parameter of the rotary member, the SIN, COS signals delivered by the groups of sensitive elements $4a$, $4b$ must be in quadrature, that is to say out of phase by 90° divided by $N_{pp}$.

In particular, by using such signals in quadrature, in the sensor or in an associated computer, it is known to determine the angular position of the encoder 1, for example, by a direct calculation of an arctangent function, with the aid of a "Look-Up Table" (LUT) or thanks to a CORDIC type method.

In the embodiment shown, the sensitive elements $4a$, $4b$ are angularly distributed along the magnetic track 2 forming between the two groups of sensitive elements $4a$, $4b$ an angle $\alpha$ that is equal to $$\frac{\pi}{2Npp}$$

modulo $$\frac{\pi}{Npp}.$$

Thus, the circumferential distribution of the sensitive elements $4a$, $4b$ makes it possible to overcome the edge effects of the magnetic field delivered by the encoder 1, making it possible to use an encoder 1 of limited height h, in particular less than $6 \cdot L_p$. In particular, the sensitive elements $4a$, $4b$ may be angularly distributed along a radius R, in particular the median radius in the figures, of the magnetic track 2 in order to be distanced as much as possible from the edges of the encoder 1.

Furthermore, by arranging the sensitive elements $4a$, $4b$ at a reading air gap distance from the magnetic track 2 that is of the order of $$\frac{Lp}{2},$$

a good compromise is obtained between sinusoidality and amplitude of the signal detected. In particular, this optimum positioning may be obtained due to the fact that the polar width $L_p$ may be between 2 and 6 mm, and this even with a number $N_{pp}$ of pairs of poles of the encoder 1 that is less than 6.

Thus, the circumferential arrangement of the sensitive elements $4a$, $4b$ has in particular the following advantages:
  the distance between the two elements $4a$, $4b$ is sufficiently large in order to use inexpensive and highly linear discrete components (Hall sensors 1D);
  the circumferential positioning tolerance of the elements $4a$, $4b$ has little impact on the accuracy of the sensor (because the distance that separates same is large);
  the two elements $4a$, $4b$ being located along the middle radius R of the encoder 1, same are not disturbed much by the edge effects;
  the arrangement of the sensitive elements $4a$, $4b$ does not depend on the polar width $L_p$;
  the reading radius R has very little effect on the quality of the magnetic signal.

In order to form the SIN, COS signals delivered by each of the groups of sensitive elements $4a$, $4b$, the sensor comprises a device for subtracting the signals $V_1$, $V_2$ delivered by the two sensitive elements $4a$, $4b$ of the group.

Thus, by positioning the sensitive elements $4a$, $4b$ at a magnetic angle respectively $\varphi_1$ and $\varphi_2$ that is such that $\varphi_2 - \varphi_1$ is equal to $\gamma$, the signals $V_1$, $V_2$ delivered may be written:

$$V_1(t) = G \cdot H_1 \cdot \sin(\omega t + \varphi_1) + G \cdot H_3 \cdot \sin(3\omega t + 3\varphi_1) + G \cdot H_5 \cdot \sin(5\omega t + 5\varphi_1) + \ldots$$

$$V_2(t) = G \cdot H_1 \cdot \sin(\omega t + \varphi_2) + G \cdot H_3 \cdot \sin(3\omega t + 3\varphi_2) + G \cdot H_5 \cdot \sin(5\omega t + 5\varphi_2) + \ldots$$

$\omega$ being the rotation speed, $H_i$ being the amplitude of the fundamental for i=1 and i-order harmonics for i=3, 5, etc.

I.e. a subtraction of signals $V_1$, $V_2$ delivered by the two sensitive elements $4a$, $4b$ spaced from the angle $\gamma$ that is written:

$$V_1(t) - V_2(t) = G \cdot H_1 \cdot [\sin(\omega t + \varphi_1) - \sin(\omega t + \varphi_2)] +$$
$$G \cdot H_3 \cdot [\sin(3\omega t + 3\varphi_1) - \sin(3\omega t + 3\varphi_2)] +$$
$$G \cdot H_5 \cdot [\sin(5\omega t + 5\varphi_1) - \sin(5\omega t + 5\varphi_2)] + \ldots =$$
$$2 \cdot G \cdot H_1 \cdot \sin\left(\frac{\varphi_1 - \varphi_2}{2}\right) \cdot \cos\left(\omega t + \frac{\varphi_1 + \varphi_2}{2}\right) +$$
$$2 \cdot G \cdot H_3 \cdot \sin\left(3 \cdot \frac{\varphi_1 - \varphi_2}{2}\right) \cdot \cos\left(3\omega t + 3 \cdot \frac{\varphi_1 + \varphi_2}{2}\right) +$$
$$2 \cdot G \cdot H_5 \cdot \sin\left(5 \cdot \frac{\varphi_1 - \varphi_2}{2}\right) \cdot \cos\left(5\omega t + 5 \cdot \frac{\varphi_1 + \varphi_2}{2}\right) + \ldots$$

Figure 2:
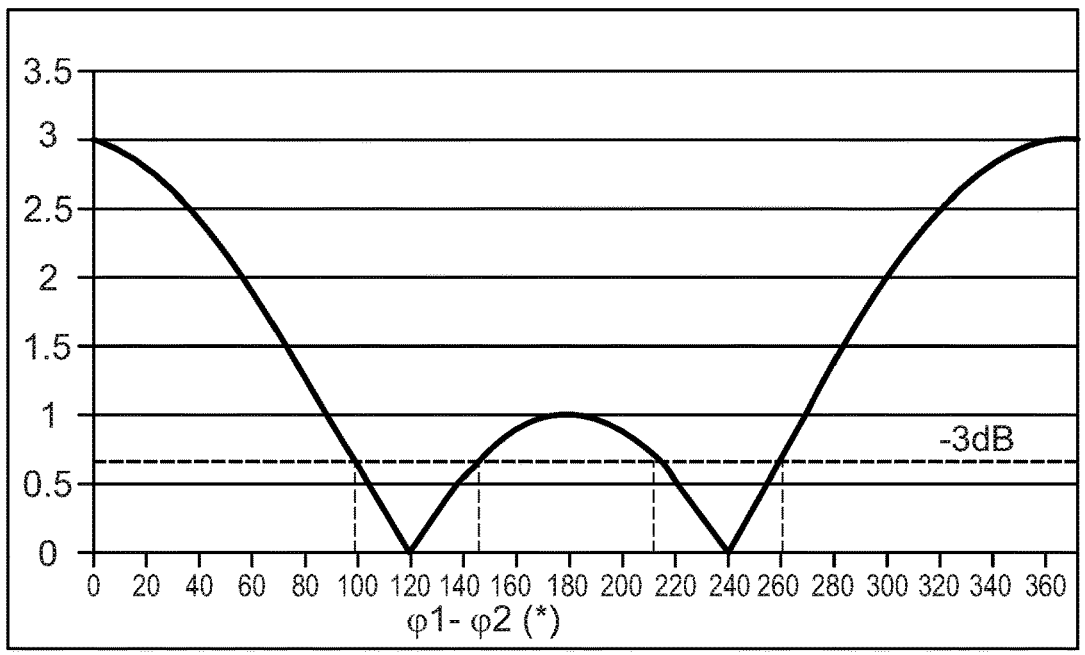
FIG. 2 is a curve showing the filtering of the 3rd order harmonic according to the angle between the sensitive elements.

FIG. 2 illustrates the filtering of the 3rd order harmonic according to the value of the angle $\gamma$. By considering that the filter of the 3rd order harmonic plays the role thereof if at least 3 dB are removed from the value thereof without filtering in relation to the amplitude of the fundamental, it is therefore necessary that:

$$\left| \frac{2 \cdot G \cdot H_3 \cdot \sin\left(3\frac{\varphi_1 - \varphi_2}{2}\right)}{2 \cdot G \cdot H_1 \cdot \sin\left(\frac{\varphi_1 - \varphi_2}{2}\right)} \right| \leq \frac{\sqrt{2}}{2} \cdot \left|\frac{H_3}{H_1}\right| \Leftrightarrow \left| \frac{\sin\left(3\frac{\varphi_1 - \varphi_2}{2}\right)}{\sin\left(\frac{\varphi_1 - \varphi_2}{2}\right)} \right| \leq \frac{\sqrt{2}}{2}$$

Consequently, the filtering of the 3rd order harmonic is satisfactory for an angle $\gamma$ that is such that:
  $0.55\pi < \gamma \cdot N_{pp} < 0.83\pi$, modulo $2\pi$; or
  $1.17\pi < \gamma \cdot N_{pp} < 1.45\pi$, modulo $2\pi$.

The elimination, or at least the attenuation, of the 3rd order harmonic in the SIN, COS signals processed in order to determine the rotation parameter is beneficial relative to the accuracy of the determination, but also for the algorithms for processing the signal that produce:
- the elimination of the offset of the SIN and COS channels;
- the equalisation of the amplitudes of the SIN and COS channels;
- the phase correction between the SIN and COS channels.

Optimally, relative to the filtering, the angle $\gamma$ is such that $\gamma \cdot N_{pp}$ is substantially equal to $2\pi/3$ or to $4\pi/3$ modulo $2\pi$, since the 3rd order harmonic is therefore cancelled:

$$V_1(t) - V_2(t) = \sqrt{3} \cdot G \cdot H_1 \cos\left(\omega t + \frac{\varphi_1 + \varphi_2}{2}\right) + 0 - \sqrt{3} \cdot G \cdot H_5 \cdot \cos\left(5\omega t + 5 \cdot \frac{\varphi_1 + \varphi_2}{2}\right) + \ldots$$

However, this angle $\gamma$ leads to a gain of $\sqrt{3}$ of the SIN, COS signals delivered by the groups of sensitive elements 4a, 4b, which may cause the angle to vary in the ranges mentioned above in order to optimise the filtering—gain pair.

In relation with FIG. 1, a system is described hereinbelow that is particularly suitable for the control of an electric motor with four pairs of poles, the system providing the absolute position on a pair of motor poles, i.e. mechanical 90°.

To do this, the encoder 1 comprises 4 pairs of poles ($N_{pp}=4$), the groups of sensitive elements 4a, 4b delivering SIN, COS signals in quadrature on each of the pairs of poles so that the sensor or the computer for controlling the motor can determine the absolute angular position on an angular sector of 90°.

In relation with FIG. 1, the sensor comprises two sensitive elements 4a, 4b forming therebetween an angle $\gamma$ of $$\frac{2\pi}{3N_{pp}} = \pi/6,$$

the angle $\alpha$ between the groups of sensitive elements 4a, 4b being $$\frac{\pi}{2N_{pp}} = \pi/8.$$

Due to the good sinusoidality of the signal at a reading air gap distance of the order of $$\frac{L_p}{2},$$

the system may deliver to the computer for controlling the motor the absolute angular position on a pair of motor poles of the rotor in an accurate way, which in particular enables:
- better performances, in particular on starting, for example the time for reaching the speed or position setpoint;
- a "smoother" operation, without torque jerking in stable state;
- a lower energy consumption;
- a lower operating temperature;
- a higher maximum torque.

What is claimed is:

1. A system for determining at least one rotation parameter of a rotary member, said system comprising:

an encoder combined in rotation with the rotary member to move jointly therewith, the encoder comprising a body having a magnetic track adapted to emit a periodic magnetic signal representative of the rotation of the encoder, the track having an alternation of North and South magnetic poles separated by i transitions, each of the transitions extending along an Archimedean spiral defined in polar coordinates in relation to the axis of rotation by the equation $$\rho = \frac{N_{pp} \cdot L_p}{\pi} \cdot (\theta + \theta_i),$$

$N_{pp}$ being the number of pairs of poles of the magnetic track and $L_p$ the polar width of each of the poles according to the radius of the encoder, the angle $\theta_i$ of rotation of the $i^{th}$ spiral in relation to the first spiral being equal to $$\frac{\pi}{N_{pp}} \cdot i$$

with i between 0 and $2 \cdot N_{pp} - 1$;

a rotation sensor able to detect the periodic magnetic field emitted by the encoder by means of a plurality of magnetic sensitive elements;

the system wherein the sensitive elements are angularly distributed along the magnetic track in order to each deliver a signal representative of the rotation of the encoder, the sensor further comprising a device for subtracting the signals ($V_1$, $V_2$) delivered by two sensitive elements forming therebetween an angle $\gamma$ that is such that:

$0.55\pi < \gamma \cdot N_{pp} < 0.83\pi$, modulo $2\pi$; or $1.17\pi < \gamma \cdot N_{pp} < 1.45\pi$, modulo $2\pi$.

2. The determination system according to claim 1, wherein the angle $\gamma$ is such that $\gamma \cdot N_{pp}$ is substantially equal to $2\pi/3$ or to $4\pi/3$ modulo $2\pi$.

3. The determination system according to claim 1, wherein the sensor comprises two groups of two sensitive elements forming therebetween an angle $\gamma$, and a device for subtracting the signals of the sensitive elements of each of the groups, the groups being angularly offset from an angle $\alpha$ that is arranged so that the signals (SIN, COS) delivered by the groups are in quadrature.

4. The determination system according to claim 3, wherein the angle $\alpha$ formed between the two groups of sensitive elements is equal to $$\frac{\pi}{2N_{pp}}$$

modulo $$\frac{\pi}{N_{pp}}.$$

5. The determination system according to claim 1, wherein the sensitive elements are distributed angularly along a radius R of the magnetic track.

6. The determination system according to claim 5, wherein the sensitive elements are distributed angularly along the median radius R of the magnetic track.

7. The determination system according to claim 1, wherein the encoder has a height that is less than $6 \cdot L_p$.

8. The determination system according to claim 1, wherein the sensitive elements are arranged at a reading air gap distance from the magnetic track that is of the order of $$\frac{L_p}{2}.$$

9. The determination system according to claim 1, wherein the number $N_{pp}$ of pairs of poles of the encoder is less than 6.

10. The determination system according to claim 1, wherein the polar width $L_p$ of the encoder is between 2 and 6 mm.

* * * * *